United States Patent [19]

Rosenquist

[11] Patent Number: 4,587,326
[45] Date of Patent: May 6, 1986

[54] POLYCARBONATE FROM NONAROMATIC CYCLIC ANHYDRIDE HAVING IMPROVED OPTICAL PROPERTIES

[75] Inventor: Niles R. Rosenquist, Evansville, Ind.

[73] Assignee: General Electric Company, Mt. Vernon, Ind.

[21] Appl. No.: 700,097

[22] Filed: Feb. 11, 1985

[51] Int. Cl.⁴ ..................... C08G 63/62; C08G 63/64
[52] U.S. Cl. .................................. 528/176; 528/190; 528/192; 528/196
[58] Field of Search ............... 528/176, 190, 192, 196

[56] References Cited

U.S. PATENT DOCUMENTS 4,238,597 12/1980 Markezich et al. ................. 528/176
4,311,822 1/1982 Dega et al. ........................... 528/176

Primary Examiner—Harold D. Anderson
Attorney, Agent, or Firm—Myron B. Kapustij; Martin B. Barancik

[57] ABSTRACT

Carbonate polymer comprised of the reaction products of:
(i) at least one dihydric phenol;
(ii) a carbonate precursor; and
(iii) an optical property improving amount of at least one cyclic anhydride represented by the general formula

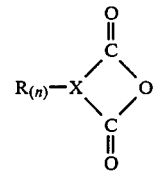

wherein:
X represents a divalent nonaromatic cyclic hydrocarbon radical;
R is independently selected from monovalent hydrocarbon radicals; and
n is a positive integer having a value of from 0 up to the number of replaceable hydrogen atoms present on X.

22 Claims, No Drawings

POLYCARBONATE FROM NONAROMATIC CYCLIC ANHYDRIDE HAVING IMPROVED OPTICAL PROPERTIES

BACKGROUND OF THE INVENTION

Polycarbonates are well known thermoplastic materials which, due to their many advantageous properties, find use as thermoplastic engineering materials. The polycarbonates exhibit, for example, excellent properties of toughness, flexibility, impact resistance, and relatively high heat distortion temperatures. The conventional polycarbonates may generally be prepared by the reaction of a dihydric phenol such as bisphenol-A with a carbonate precursor such as phosgene.

However, relatively thin conventional polycarbonate resin films, particularly those prepared by the solvent casting process, exhibit somewhat less than ideal optical properties. More particularly, solvent cast films comprised of conventional polycarbonate resins exhibit a degree of haze which renders them useless for certain applications where optical clarity is critical.

It is an object of the instant invention to provide polycarbonate resins which may be used to form cast films exhibiting improved optical properties, particularly reduced haze.

SUMMARY OF THE INVENTION

The instant invention is directed to carbonate polymers which are derived from (i) at least one dihydric phenol, (ii) a carbonate precursor, and (iii) at least one cyclic anhydride.

DESCRIPTION OF THE INVENTION

It has been discovered that polycarbonates can be prepared which, when formed into thin films, particularly thin films formed via the solvent casting process, yield films exhibiting improved optical properties, particularly reduced haze, as compared with films formed from conventional carbonate polymers.

These carbonate polymers are obtained by the reaction of (i) at least one dihydric phenol, (ii) a carbonate precursor, and (iii) at least one cyclic anhydride.

The cyclic anhydrides employed in the practice of the instant invention may be represented by the general formula

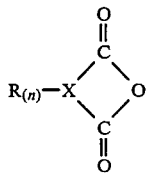

I.

wherein:

X represents a divalent cyclic hydrocarbon radical containing from 5 to about 8 ring carbon atoms;

R is independently selected from halogen and monovalent hydrocarbon radicals; and n is a positive integer having a value of from 0 up to the number of replaceable hydrogen atoms present on X, inclusive.

The divalent cyclic hydrocarbon radicals represented by X are generally aliphatic in character. The term "aliphatic in character" means that they exhibit properties which are closer to the cycloaliphatic compounds rather than to the aromatic compounds. That is to say, they are not aromatic compounds such as phenylene. The cyclic hydrocarbon radicals represented by X thus either contain no double bonds in the ring structure, i.e., they are cycloaliphatic, or they contain at most one double bond in the ring structure. Thus X represents either a cycloalkylene radical or a cycloalkenylene radical containing from 5 to about 8 ring carbon atoms. These cyclic radicals are monocyclic. By monocyclic is meant that they are comprised of only one ring structure. This single ring structure may, however, be a bridged structure.

The monovalent hydrocarbon radicals represented by R are preferably selected from alkyl radicals. The preferred alkyl radicals are the lower alkyl radicals containing from 1 to about 4 carbon atoms. Some illustrative non-limiting examples of these preferred lower alkyl radicals include methyl, ethyl, propyl, isopropyl, butyl, and tertiarybutyl.

While n represents a positive integer having a value of from 0 up to the number of replaceable hydrogen atoms present on X, it is preferred that n have a value of from 0 to 3 inclusive.

In the cyclic anhydrides represented by Formula I the two carbonyl carbon atoms of the anhydride portion are bonded to different ring carbon atoms of the cyclic radical X, preferably to adjacent ring carbon atoms of X.

The halogen radicals represented by R are preferably selected from chlorine and bromine.

Preferred compounds of Formula I are those wherein R, if present, is selected from lower alkyl radicals, n has a value of from 0 to about 3 inclusive, and X contains from 6 to 7 ring carbon atoms.

Some illustrative non-limiting examples of the preferred compounds of Formula I include

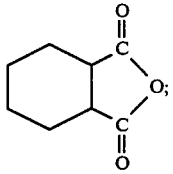

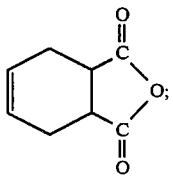

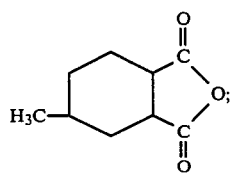

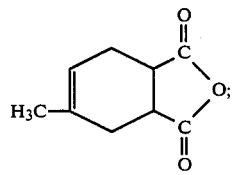

-continued

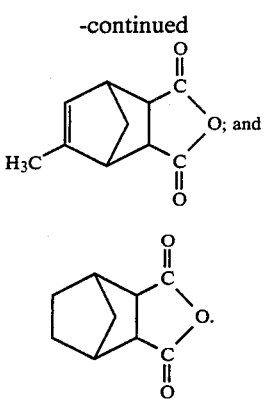

The compounds of Formula I are well known in the art and are generally commercially available or may readily prepared by known methods.

The dihydric phenols useful in the preparation of the instant polymers may be represented by the general formula

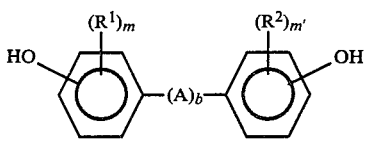

wherein:

$R^1$ and $R^2$ are independently selected from halogen, monovalent hydrocarbon, and monovalent hydrocarbonoxy radicals;

A is selected from divalent hydrocarbon radicals,

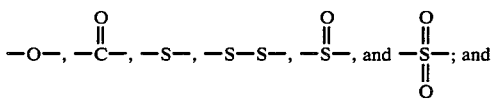

b is 0 or 1 m and m' are independently selected from positive integers having a value of from 0 to 4 inclusive.

The monovalent hydrocarbon radicals represented by $R^1$ and $R^2$ include the alkyl, cycloalkyl, aryl, aralkyl and alkaryl radicals. Preferred alkyl radicals are those containing from 1 to about 10 carbon atoms. Preferred cycloalkyl radicals are those containing from 4 to about 8 ring carbon atoms. Preferred aryl radicals are those containing from 6 to 12 ring carbon atoms, i.e., phenyl, naphthyl, and biphenyl. Preferred aralkyl and alkaryl radicals are those containing from 7 to about 14 carbon atoms.

The monovalent hydrocarbonoxy radicals represented by $R^1$ and $R^2$ have the general formula —$OR^3$ wherein $R^3$ is the same as $R^1$ and $R^2$.

Preferred halogen radicals are chlorine and bromine.

The divalent hydrocarbon radicals represented by A include alkylene, alkylidene, cycloalkylene, and cycloalkylidene radicals. The preferred alkylene radicals are those containing from 2 to about 20 carbon atoms. The preferred alkylidene radicals are those containing from 1 to about 20 carbon atoms. The preferred cycloalkylene and cycloalkylidene radicals are those containing from 4 to about 16 ring carbon atoms.

Some illustrative non-limiting examples of the dihydric phenols falling within the scope of Formula II include:

2,2-bis(4-hydroxyphenyl)propane (bisphenol-A);
1,1-bis(4-hydroxyphenyl)propane;
1,5-bis(4-hydroxyphenyl)pentane;
1,1-bis(4-hydroxyphenyl)decane;
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(3,5-dimethyl-4-hydroxyphenyl)cyclohexane;
1,1-bis(3-methyl-5-chloro-4-hydroxyphenyl)cyclohexane;
1,3-bis(4-hydroxyphenyl)propane;
bis(4-hydroxyphenyl)ether;
p,p'-dihydroxydiphenyl;
4,4'-thiodiphenol; and
bis(3,5-diisopropyl-4-hydroxyphenyl)sulfone.

Other useful dihydric phenols are disclosed in U.S. Pat. Nos. 3,169,121, 2,999,835, 3,027,365, 3,334,154, 3,035,021, 3,036,036, 3,036,037, 3,036,038, 3,036,039 and 4,111,910, all of which are incorporated herein by reference.

It is, of course, possible to employ a mixture of two or more different dihydric phenols as well as individual dihydric phenols in the preparation of the instant polymers.

The preferred dihydric phenols are the 4,4'-bisphenols such as, for example, bisphenol-A.

The carbonate precursor may be a carbonyl halide, a carbonate ester, or a bishaloformate. The carbonyl halides which may be employed herein are carbonyl bromide, carbonyl chloride, and mixtures thereof. Typical carbonate esters which may be used are the diaryl carbonates such as diphenyl carbonate; di(halophenyl)carbonates such as di(chlorophenyl)carbonate, di(bromophenyl)carbonate, di(trichlorophenyl)carbonate, etc.; di(alkylphenyl)carbonates such as di(tolyl)carbonate, etc.; phenyl tolyl carbonate; chlorophenyl chloronaphthyl carbonate; etc.; or mixtures thereof. The bishaloformates suitable for use herein include the bishaloformates of dihydric phenols such as the bischloroformate of hydroquinone, bischloroformate of bisphenol-A, and the like; or bishaloformates of glycols such as the bischloroformates of ethylene glycol, polyethylene glycol, neopentyl glycol, and the like. The preferred carbonate precursor is carbonyl chloride, also known as phosgene.

A particularly useful method for preparing the instant carbonate polymers of the instant invention is the interfacial polymerization process utilizing, as the reactants, the aforedescribed cyclic anhydrides, dihydric phenols and carbonate precursor, and also utilizing an aqueous caustic solution, a water immiscible organic solvent such as methylene chloride, a catalyst, and a molecular weight regulator.

The catalysts which may be employed are any of the well known catalysts which catalyze the carbonate polymer forming reaction. These catalysts include, but are not limited to, tertiary amines as as triethyl amine, tripropyl amine, N, N-dimethylaniline, quaternary phosphonium compounds, and quaternary ammonium compounds.

The molecular weight regulators are any of the known compounds that regulate the molecular weight of the carbonate polymer by a chain terminating mechanism. These compounds include, but are not limited to, phenol, tertiarybutyl phenol, and chroman-I.

The amount of the cyclic anhydrides of Formula I used in the preparation of the instant carbonate polymers is an optical property improving amount. By optical property improving amount is meant an amount effective to improve the optical properties of cast films, i.e., effective to reduce the haze of said films. Generally this amount is from about 1 to about 10 mole percent, preferably from about 2 to about 9 mole percent, and more preferably from about 3 to about 8 mole percent. Mole percent of cyclic anhydride is based upon the total amounts of said anhydride and said dihydric phenol used.

Generally, if less than about one mole percent of said anhydride is used there is no significant improvement in the optical properties of the films. If more than about 10 mole percent is used the polymer begins to lose some of the advantageous properties of polycarbonates.

The instant high molecular weight thermoplastic carbonate polymers contain recurring carbonate, carboxylate, and aromatic carbocyclic groups in the polymer chain in which at least some of the carbonate groups and at least some of the carboxylate groups are bonded directly to the ring carbon atoms of the aromatic carbocyclic groups.

The instant carbonate polymers contain ester bonds and carbonate bonds in the polymer chain, wherein the amount of ester bonds is in the range of from about 1 to about 10 mole percent, preferably from about 2 to about 9 mole percent, and more preferably from about 3 to about 8 mole percent. For example, 5 moles of bisphenol-A reacting completely with 0.5 mole of cyclic anhydride and 4.5 mole of phosgene would give a carbonate polymer of 10 mole percent ester bonds.

The instant carbonate polymers contain at least the following two recurring structural units:

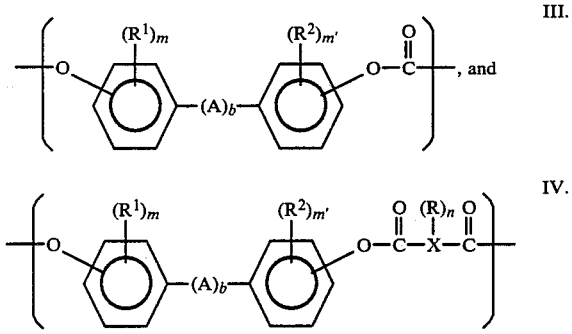

wherein R, $R^1$, $R^2$, A, b, m, m' and n are as defined hereinafore.

Units IV are present in amounts of from about 1 to about 10 mole percent, based on the total amounts of units III and IV present, depending upon the amount of the cyclic anhydride used.

The instant high molecular weight thermoplastic carbonate polymers generally have an intrinsic viscosity, as determined in methylene chloride at 25° C., of at least about 0.5 dl/g, preferably at least about 0.6 dl/g.

Also included herein are the randomly branched thermoplastic carbonate polymers. These polymers are prepared by the reaction of (i) at least one anhydride of Formula I, (ii) at least one phenol of Formula II, (iii) a carbonate precursor, and (iv) a minor amount of a branching agent. The branching agents are well known compounds and are generally aromatic compounds containing at least three functional groups which may be hydroxyl, carboxyl, carboxylic anhydride, haloformyl, or mixtures thereof. Some illustrative non-limiting examples of these polyfunctional aromatic compounds include trimellitic anhydride, trimellitic acid, trimellityl trichloride, 4-chloroformyl phthalic anhydride, pyromellitic acid, mellitic acid, mellitic anhydride, trimesic acid, benzophenonetetracarboxylic acid, and the like.

Also included herein are blends of linear and branched carbonate polymers.

The instant carbonate polymers may optionally have admixed therewith the commonly known and used additives such as, for example, antioxidants; ultraviolet radiation absorbers such as the benzophenones, benzotriazoles, and cyanoacrylates; hydrolytic stabilizers such as the epoxides disclosed in U.S. Pat. Nos. 3,489,716, 3,138,379, and 3,839,247, all of which are hereby incorporated herein by reference; color stabilizers such as the organophosphites dsiclosed in U.S. Pat. Nos. 3,305,520 and 4,118,370, both of which are incorporated herein by reference; and flame retardants.

It is to be understood that in the preparation of the instant carbonate polymers only one cyclic anhydride of Formula I may be used or a mixture of two or more different cyclic anhydrides may be used.

The solvent cast films of the instant invention may be prepared by conventional and well known solvent casting processes which comprise dissolving the carbonate polymer in an organic solvent, such as for example, methylene chloride, pouring the solution into a template, and evaporating the solvent to form the film. These films generally have a thickness of from about 0.5 to about 25 mils, preferably from about 1 to about 15 mils.

DESCRIPTION OF THE PREFERRED EMBODIMENTS

In order that those skilled in the art may better understand how the instant invention is practiced the following examples are set forth by way of illustration and not by way of limitation. In the examples all parts and percentages are on a weight basis unless otherwise indicated.

The following example illustrates a solvent cast film prepared from a conventional polycarbonate resin falling outside the scope of the instant invention. This example is presented for comparative purposes only.

EXAMPLE 1

This example illustrates a solvent cast film prepared from bisphenol-A polycarbonate.

A 1000 ml four neck flask is fitted with a mechanical stirrer, a pH probe, aqueous caustic inlet tube and a Claisen adapter to which is attached a dry ice condenser and a gas inlet tube. To the flask are added 300 ml water, 450 ml methylene chloride, 0.7 ml triethyl amine (0.005 mole), 57 g (0.25 mole) bisphenol-A, and 0.24 g (0.0016 mole) 4-tertiarybutyl phenol. With stirring the pH is raised to 10 by the addition of 25% aqueous sodium hydroxide solution. Phosgene is introduced into the flask at a rate of 1 g/min for 30 minutes (0.3 mole) with the pH maintained at 10–11 by the use of said aqueous caustic solution. The resin layer is separated from the brine layer, washed with 3 weight percent aqueous HCl until the washing remains acidic, and twice with distilled water. The resin is then precipitated into 1500 ml of methanol in a Waring blender, washed with 500 ml of methanol, and allowed to air dry.

A solvent cast film is prepared from this resin by dissolving 5 g of this resin in 95 g of methylene chloride and pouring the solution into a 5 in×10 in stainless steel template resting on a glass plate. An inverted glass dish is loosely placed over the glass plate and the solvent is gradually evaporated.

Samples for percent haze determination are cut from the center of the film. The % haze values are determined on a Gardner Pivotable-Sphere Hazemeter (Model HG-1204). The results are set forth in Table I.

The following examples illustrate the solvent cast films of the instant invention.

EXAMPLE 2

A 1000 ml four neck flask is fitted with a mechanical stirrer, a pH probe, aqueous caustic inlet tube and a Claisen adapter to which is attached a dry ice condenser and a gas inlet tube. To the flask are added 300 ml water, 450 ml methylene chloride, 0.7 ml triethyl amine (0.005 mole) 57 g (0.25 mole) bisphenol-A, 0.24 g (0.0016 mole) 4-tertiarybutyl phenol, and 0.0125 mole (5 mole % based on bisphenol-A) of cis-1,2-cyclohexane dicarboxylic anhydride. With stirring the pH is raised to 10 the addition of 25% aqueous sodium hydroxide. Phosgene is introduced into the flask at the rate of 1 g/min for 30 minutes (0.3 mole) with the pH maintained at 10 to 11 by the use of said aqueous caustic solution. The resin layer is separated from the brine layer, washed with 3 weight percent aqueous HCl until the washing remains acidic, and twice with distilled water. The resin is precipitated into 1500 ml of methanol in a Waring blender and washed with 500 ml more methanol and allowed to air dry.

The resin is then formed into a solvent cast film substantially in accordance with the procedure of Example 1.

The % haze of this film is determined and the results are set forth in Table I.

EXAMPLES 3–6

The procedure of Example 2 is substantially repeated except that the 0.0125 mole of cis-1,2-cyclohexane dicarboxylic anhydride is replaced with 0.0125 mole of other cyclic anhydrides as set forth in Table I.

The % haze of these films is determined and the results are set forth in Table I.

TABLE I

| Example No. | Cyclic Anhydride | IV of resin (dl/g)* | % haze of film | film thickness (mils) |
| --- | --- | --- | --- | --- |
| 1 | none | 0.803 | 42.3 | 5.0 |
| 2 | cis-1,2-cyclohexane dicarboxylic anhydride | 0.789 | 6.8 | 4.2 |
| 3 | tetrahydrophthalic anhydride | 0.906 | 5.5 | 4.3 |
| 4 | hexahydro-4-methyl phthalic anhydride | 0.630 | 3.9 | 4.2 |
| 5 | tetrahydro-4-methyl phthalic anhydride | 0.692 | 4.6 | 4.2 |
| 6 | 5-methyl-5-norbornene-2,3-dicarboxylic anhydride | 0.825 | 6.9 | 4.3 |

*Intrinsic viscosity as determined in methylene chloride at 25° C.

As illustrated by the data in Table I the carbonate polymers of the instant invention yield films which exhibit improved haze as compared with films prepared from conventional polycarbonates such as bisphenol-A (Example 1).

The foregoing detailed description has been given for clearness of understanding only and no unecessary limitations are to be understood therefrom. The invention is not limited to the exact details shown and described herein, for obvious modifications will occur to those skilled in the art.

What is claimed is:

1. Solvent cast polycarbonate film exhibiting improved haze containing a polycarbonate resin consisting essentially of the polymeric reaction product of:
   (i) at least one dihydric phenol;
   (ii) a carbonate precursor; and
   (iii) an amount effective to improve the haze of said film but insufficient for said polycarbonate to lose some of its advantageous properties, said amount being from about 1 to about 10 mole percent based on the total amounts of said dihydric phenol and cyclic anhydride employed, of at least one cyclic anhydride represented by the general formula

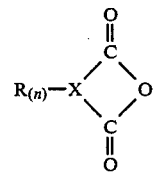

wherein
X is selected from cycloalkylene or cycloalkenylene radicals having the two carbonyl groups bonded directly to adjacent ring carbon atoms,
R is independently selected from lower alkyl radicals, and
n has a value of from 0 up to the number of replaceable hydrogen atoms present on X.

2. The film of claim 1 wherein said monovalent hydrocarbon radicals represented by R are selected from alkyl radicals.

3. The film of claim 2 wherein said alkyl radicals are selected from lower alkyl radicals.

4. The film of claim 1 wherein X represents a cycloalkylene radical.

5. The film of claim 4 wherein said cycloalkylene radical contains from 6 to 7 ring carbon atoms.

6. The film of claim 5 wherein said cycloalkylene radical contains 6 ring carbon atoms.

7. The film of claim 6 wherein n is one.

8. The film of claim 7 wherein R represents a lower alkyl radical.

9. The film of claim 6 wherein n is zero.

10. The film of claim 1 wherein X represents a cycloalkenylene radical.

11. The film of claim 10 wherein said cycloalkenylene radical contains from 6 to 7 ring carbon atoms.

12. The film of claim 11 wherein n is one.

13. The film of claim 12 wherein R is a lower alkyl radical.

14. The film of claim 11 wherein n is zero.

15. The film of claim 1 wherein said carbonate precursor is phosgene.

16. The film of claim 15 wherein said dihydric phenol is bisphenol-A.

17. The film of claim 1 wherein said haze improving amount is from about 2 to about 9 mole percent.

18. The film of claim 17 wherein said haze improving amount is from about 3 to about 8 mole percent.

19. The film of claim 1 wherein n has a value of from 0 to 3 inclusive.

20. The film of claim 19 wherein n is zero.

21. The film of claim 1 wherein said cycloalkylene or cycloalkenylene radicals contain from 5 to about 8 ring carbon atoms.

22. The film of claim 21 wherein said cycloalkylene or cycloalkenylene radicals contain from 6 to 7 ring carbon atoms.

* * * * *